United States Patent [19]

Sheehan et al.

[11] Patent Number: 4,916,888
[45] Date of Patent: Apr. 17, 1990

[54] METHOD OF DISPENSING A SUBSTANCE ONTO A CROP MATERIAL AT A CONTROLLED RATE

[75] Inventors: Ronald T. Sheehan, Lancaster; Shaun A. Seymour, New Holland, both of Pa.

[73] Assignee: Ford New Holland, Inc., New Holland, Pa.

[21] Appl. No.: 313,426

[22] Filed: Feb. 22, 1989

[51] Int. Cl.⁴ .............................................. A01D 75/00
[52] U.S. Cl. ......................................... 56/147; 56/341; 56/DIG. 2; 56/DIG. 15; 56/DIG. 23; 100/74
[58] Field of Search .................... 56/10.2, 1, 131, 341, 56/DIG. 2, DIG. 5, DIG. 15, DIG. 23, 14.7, 16.8; 100/74, 88, 89; 426/636

[56] References Cited

U.S. PATENT DOCUMENTS

| 3,221,639 | 12/1965 | Rimmey | 100/4 |
|---|---|---|---|
| 4,205,514 | 6/1980 | Wolrab | 56/341 |
| 4,228,638 | 10/1980 | Rabe et al. | 56/341 |
| 4,327,537 | 5/1982 | Wolrab | 56/1 |
| 4,335,855 | 6/1982 | Staskal et al. | 239/654 |
| 4,352,267 | 10/1982 | Mellinger | 56/341 |
| 4,450,178 | 5/1984 | Korsgaard | 426/69 |
| 4,550,556 | 11/1985 | Meiners | 56/DIG. 5 |
| 4,624,180 | 11/1986 | Strosser | 100/41 |
| 4,748,802 | 6/1988 | Strosser et al. | 56/341 |
| 4,855,974 | 8/1989 | Strosser et al. | 364/468 |

FOREIGN PATENT DOCUMENTS

| 3232746 | 3/1984 | Fed. Rep. of Germany | 56/341 |
|---|---|---|---|
| 2473259 | 7/1981 | France | |
| 1165294 | 7/1985 | U.S.S.R. | 100/88 |
| 1281086 | 7/1972 | United Kingdom | |
| 2088487 | 6/1982 | United Kingdom | |

Primary Examiner—Stephen J. Novosad
Assistant Examiner—Terry Lee Melius
Attorney, Agent, or Firm—Griffin, Branigan & Butler

[57] ABSTRACT

A method of dispensing a substance, in solid or liquid form, onto a crop material being baled, the substance being dispensed onto the crop material before it is baled at a rate which is dependent on the moisture content of the crop material and the bulk rate of flow of crop material through the baler. The method is applicable to round balers or square balers.

8 Claims, 3 Drawing Sheets

METHOD OF DISPENSING A SUBSTANCE ONTO A CROP MATERIAL AT A CONTROLLED RATE

BACKGROUND OF THE INVENTION

The present invention relates to a method suitable for use with either square balers or round balers, said method providing for the dispensing of a preservative or other substance, either in liquid or solid particulate form, onto a crop material being baled.

Round balers and square (i.e. rectangular) balers are well known in the art and are used to form bales from a variety of forage crops. The bales thus formed are frequently stored in the open and the larger balers form bales weighing 1000–2000 pounds which are frequently stored in the fields where they are formed.

Storage of bales in the open results in a certain amount of spoilage or wastage when the bales take on moisture and the crop material spoils. Also, when the crop material is baled at a time when it has too high a moisture content, subsequent exposure to air results in the growth of mold, mildew and fungus. In either case, the bales thus spoiled may cause harm to livestock if used as feed. Thus, spoilage has caused economic losses not only from the loss of the baled forage crop but also from the loss of livestock which are fed the spoiled crop material. Therefore, various efforts have been made to provide attachments to balers, or some other apparatus, for applying a preservative or other substance to the crop material either as it is being baled or after the bales have been formed.

Various mechanisms are disclosed in the prior art for dispensing a preservative or other substance onto, or into a bale of crop material. Korsgaard U.S. Pat. No. 4,450,178 discloses a bale handling apparatus for handling round bales after they are formed and having injectors for injecting a preservative such as ammonia into each bale as it is being handled by the apparatus.

Wolrab U.S. Pat. Nos. 4,205,514 and 4,327,537 disclose apparatus for dispensing a substance onto a crop material being baled by a round baler, the substance being in liquid form and sprayed onto the crop material for the purpose of sealing, adding nutrients or preventing spoilage.

Rabe et al. U.S. Pat. No. 4,228,638 discloses an apparatus suitable for use with a round baler and capable of dispensing a liquid preservative onto the crop material. In this apparatus sensors sense the width of the mat of incoming crop material and control valves so that preservative is sprayed from nozzles only over the width of the mat.

Mellinger U.S. Pat. No. 4,352,267 and Staskal U.S. Pat. No. 4,335,855 each disclose an apparatus suitable for use on a round baler, for dispensing a dry particulate preservative onto a crop material as it is being baled.

The systems disclosed in the aforementioned patents apply the substance to the crop material at a fixed rate and thus in some cases apply too much of the substance and in other cases apply too little of the substance where the substance being applied is a preservative. The reason for this is that the rate at which a substance should be applied is dependent upon the rate of crop flow through the baler (bulk rate of crop flow) and the moisture content of the crop material and the prior art does not take either of these factors into account.

The present invention provides a method for varying the rate at which a substance is dispensed onto a crop material, thereby overcoming the deficiencies of the prior art.

BRIEF DESCRIPTION OF THE INVENTION

An object of the present invention is to provide a method, suitable for use with a square baler or a round baler, of dispensing a substance onto a crop material being baled at a rate which does not waste the substance.

An object of the present invention is to provide a method of dispensing a substance onto a crop material being baled, the substance being dispensed at a rate dependent on the moisture content of the crop material being baled.

An object of the present invention is to provide a method of dispensing a substance onto a crop material being baled, the substance being dispensed at a rate dependent on the bulk rate of crop flow through the baler.

An object of the present invention is to provide, in a baler for picking up crop material and forming it into bales, a method of dispensing a substance from a container onto crop material at a controlled rate, the method comprising sensing the moisture content of the crop material to develop a first signal, sensing the bulk rate at which crop material is passing through the baler to develop a second signal, developing a third signal from first and second signals and dispensing the substance onto the crop material at a rate determined by the third signal.

Other objects of the invention and its mode of operation will become apparent upon consideration of the following description and the accompanying drawing.

DETAILED DESCRIPTION OF THE INVENTION

Figure 1:
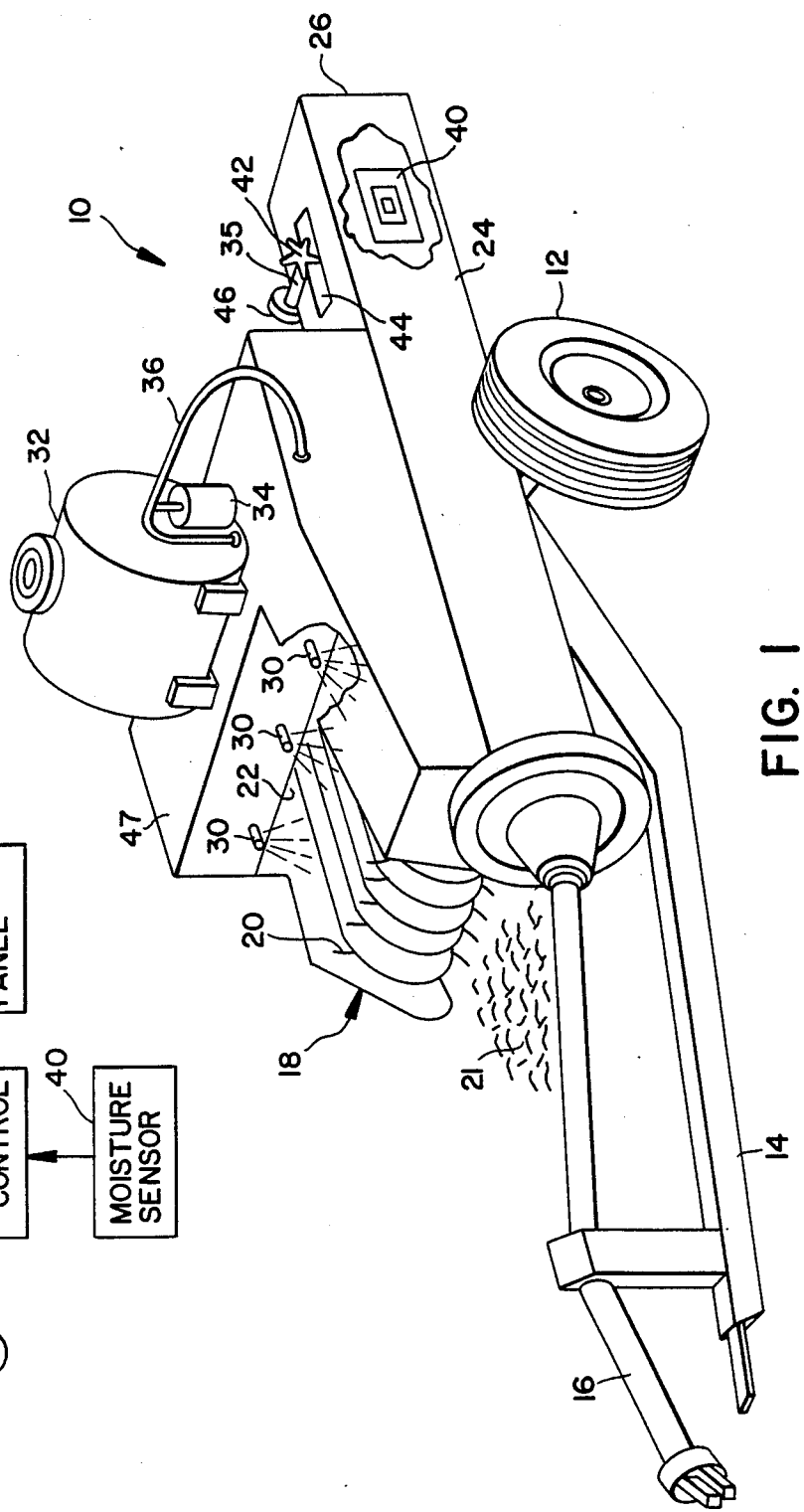
FIG. 1 is a schematic perspective view, partly broken away, illustrating a square baler with apparatus for dispensing a liquid substance onto crop material entering the baler.

FIG. 1 illustrates a first embodiment of the invention wherein a liquid substance is applied to a crop material which is baled into square bales. The baler 10 is of conventional design and may, for example, be a Model 311 baler manufactured by Ford New Holland. This baler has wheels 12 supporting a frame having a tongue 14 which may be hitched to a tractor (not shown) so that the tractor may pull the baler along a windrow. A power take-off 16 is connected to, and is driven in rotation by, the tractor to provide mechanical power for operating various elements of the baler.

The baler has a pickup 18 with tines 20 and as the baler is pulled along a windrow the crop material is picked up by tines 20 and fed into the baler at an in-take opening 22. After entering the baler the crop material is moved transversely to the direction of movement of the baler and enters a bale case 24 where it is compacted by a reciprocating plunger (not shown). A bale tying mechanism (not shown) ties the compacted crop material into bales. Each bale is pushed through the open end 26 of the bale case by the next succeeding bale as the reciprocating plunger pushes compacted crop material behind them.

The baler 10 is provided with a plurality of spray nozzles 30 positioned above the crop in feed path, and a motor-driven pump 34. Tank 32 is filled with a liquid substance to be applied to the crop material and this substance is pumped by pump 34 through a fluid conduit 36 to the spray nozzles 30 where it is sprayed onto the crop material as the crop material is fed into the baler.

The rate at which the substance should be dispensed from nozzles 30 is dependent on the moisture content of the crop material and the amount of crop material passing through the baler per unit of time. A moisture sensor 40 is mounted on an interior wall of bale case 24 near exit opening 26 for the purpose of sensing the moisture content of each bale exiting from the baler. The moisture sensor 40 may be any suitable conventional moisture sensor and may, for example, be of the type disclosed in application Ser. No. 97,897 filed Sept. 17, 1987, assigned to the same assignee as the present application.

A sensing arrangement like that shown in U.S. Pat. No. 3,221,639, and including a shaft 35 and a star-wheel 42, is mounted above the bale case 24 with the star-wheel extending through an opening 44 into the bale case. The arrangement is such that bales of crop material being pushed through the bale case engage points on star-wheel 42 and thus rotate the star-wheel and the shaft 35 to which it is affixed. This arrangement provides a measure of the amount of crop material passing through the baler. However, because of the reciprocating action of the plunger which compresses the crop material in the bale case, the crop material moves forward during the compression stroke of the plunger but expands and moves backward during the return stroke of the plunger. Therefore, the star-wheel sensor arrangement disclosed in U.S. Pat. No. 3,221,639 provides a crop flow rate which is somewhat inaccurate. In accordance with one aspect of the present invention the shaft 35, which corresponds to shaft 35 of U.S. Pat. No. 3,221,639, is provided with a quadrature encoder 46 of the type disclosed in U.S. Pat. No. 4,748,802. Quadrature encoder 46 eliminates "false" output signals caused by the expansion/contraction of the crop material in the bale casing, and produces output signals which indicate the true rate at which crop material is passing through the baler.

Figure 2:
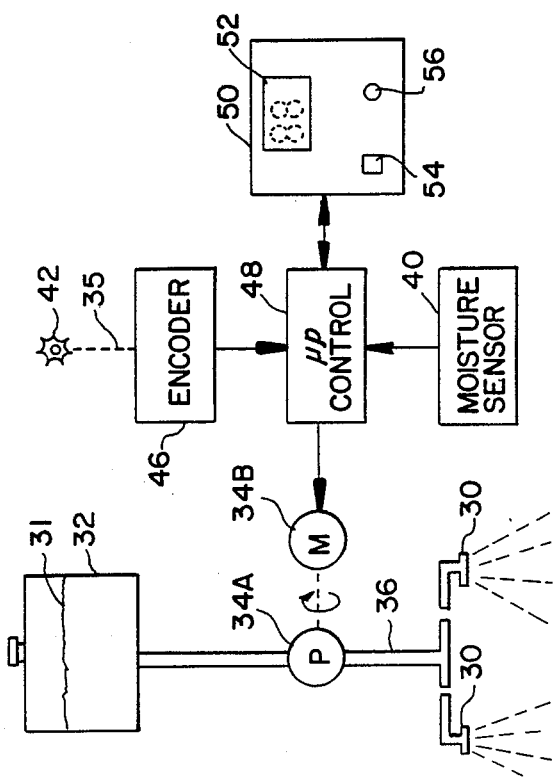
FIG. 2 illustrates a circuit for controlling the dispensing of a liquid substance at a controlled rate.

FIG. 2 shows a control circuit for controlling the dispensing of a substance 31 in tank 32 through nozzles 30 onto crop material. The speed of rotation of pump 34A, driven by motor 34B determines the pressure in fluid conduit 36 and thus controls the rate of dispensing of the substance. Star-wheel 42 drives encoder 46 which produces output pulses at a rate proportional to the rate of rotation of star-wheel 42 and thus proportional to the weight of crop material passing through the bale case per unit of time, e.g. tons/hr. Moisture sensor 40 produces an output signal indicating the percent moisture content in the crop material. Any suitable control circuit means 48 may be provided for controlling motor 34B so that pump 34A is driven at a rate dependent on the magnitude of the signal from moisture sensor 40 and the number of pulses per unit time from encoder 46. Preferably, the control means comprises a microprocessor-based control system as disclosed in U.S. Pat. No. 4,624,180 in which case the operator panel 50 may also be like that shown in the patent.

Insofar as the present invention is concerned, the operator panel 50 includes a display 52 for visually displaying to the operator the percent moisture content of the crop material or the bulk rate of crop flow through the baler in tons per hour, and a warning indicator 56, the purpose of which is discussed below. The operator panel also includes a key or switch 54 which the operator must set depending on the size of the spray nozzles 30 he has installed on the baler. In this regard, it has been found that one size nozzle is not adequate for all combinations of crop material moisture content and bulk crop flow rate. For example, nozzles which may be capable of spraying the desired amount of substance when the moisture content and bulk crop flow rate are low are so small that pump 34A cannot force the required amount of substance through the nozzles regardless of the pressure produced in fluid conduit 36 when the moisture content and bulk crop flow rate are high. The reverse is also true. If nozzles 30 are large enough to dispense sufficient substance when the moisture content and bulk crop flow rate are high, they do not provide the desired spray distribution onto the crop material when the moisture content and bulk crop flow rate are low and pump 34A is producing a low pressure in fluid conduit 36. The switch 54 is provided so that the operator may indicate to the control circuit means 48 which size nozzles he has installed.

Figure 3:
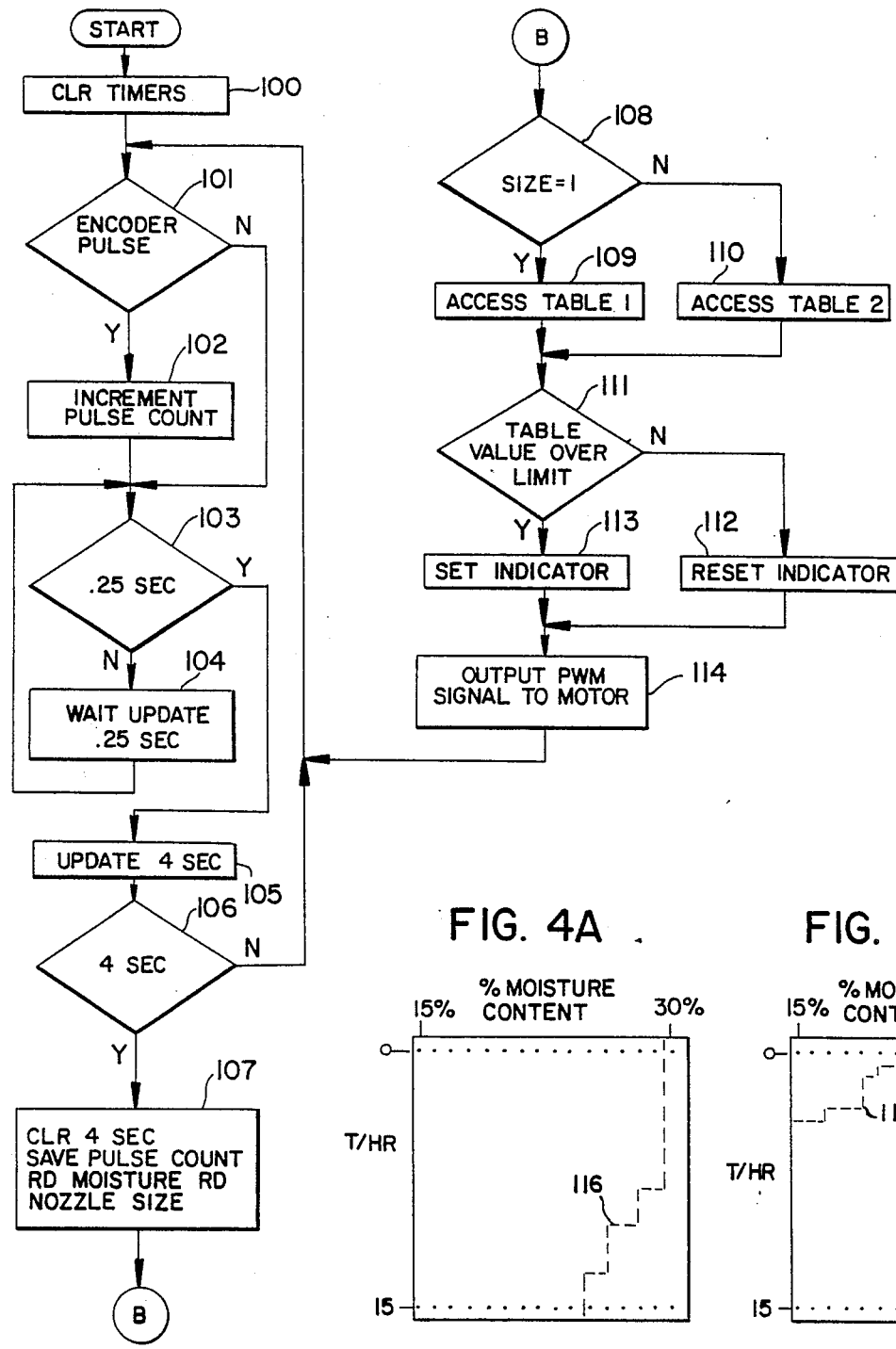
FIG. 3 illustrates the sequence of operations of the control circuit means of FIG. 2.

FIG. 3 illustrates a suitable program or routine for controlling the dispensing of substance if the control circuit means 48 is a microprocessor based control system of the type shown in U.S. Pat. No. 4,624,180. The routine begins at step 100 by clearing a 0.25 second timer and a 4 second timer. At step 101 a test is made to see if the encoder 46 has applied a pulse to the microprocessor. Assuming it has not, the program jumps to step 103 where a test is made to see if the 0.25 second timer has timed a full quarter-second interval. On the other hand, if the encoder has applied a pulse to the microprocessor, the count in a pulse count register is incremented at step 102 before the program moves to step 103.

If the test at step 103 shows that one quarter second has not been tolled by the timer, the program executes a wait and updates the 0.25 second timer at step 104 and returns to step 103.

At the end of each quarter-second interval, the test at step 103 proves true and the program jumps to step 105 to update a 4 second timer. The timer is then tested at step 106 and if 4 seconds have not elapsed the program jumps back to step 101. Thus, the loop comprising steps 101–106 is executed every 0.25 second with the count in a pulse count register being incremented at step 102 each time the loop is executed.

At the end of each 4-second interval the test at step 106 proves true and the program advances to step 107 where it clears the 4-second timer, reads the moisture indication being generated by moisture sensor 40, and reads the state of switch 54 on the operator panel. The program also saves the pulse count accumulated as of the last execution of step 102, this pulse count representing the bulk rate of crop flow through the baler. The program then advances to step 108 where it tests the indication of the state of switch 54 as read at step 107.

If switch 54 is set to indicate that small nozzles 30 are installed the program advances to step 109 but if the switch is set to indicate that large nozzles are installed the program jumps to step 110. At step 109 the program concatenates the pulse count saved at step 107 with the moisture content read at the same step to thereby obtain a table address in a first table. This address is then added to the base address of the table to obtain the address of one value in the table. If step 110 is performed it executes a similar procedure which differs only in that the base address of a second table is used whereby a value from the second table is obtained.

Figure 4A:
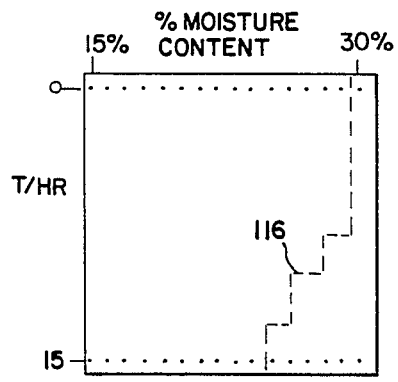
FIGS. 4A and 4B illustrate two tables of values accessed by the control circuit means of FIG. 2.
Figure 4B:
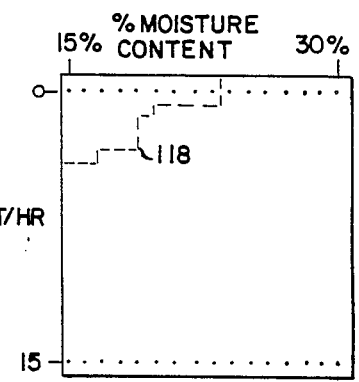

FIGS. 4A and 4B illustrate the first and second tables, respectively. Each table has 256 addresses for storing 256 bytes of binary values. These values, after conversion to pulse width modulated signals and application to motor 34B, cause the motor and thus pump 34A to rotate at a speed such that the pressure developed in fluid conduit 36 causes the substance to be dispensed from nozzles 30 at the desired rate for the moisture content and bulk rate of crop flow sensed. The actual conversion of a binary value to a pulse width modulated signal occurs at step 114. Above-referenced U.S. Pat. No. 4,624,180 discloses a subroutine wherein a pulse width modulated signal is generated from a binary value and continuously applied to a motor.

The values stored in the tables of FIGS. 4A and 4B are chosen for conditions between 15% and 30% crop moisture content because crops are seldom baled with a moisture content of less than 15% or more than 30%. Also the values in the tables are chosen for bulk crop flow rates of between 0 and 15 tons per hour since this is the range of bulk crop flow rates for the majority of balers. Obviously, the ranges of values may be changed or the tables enlarged as desired for a specific baler.

The purpose of steps 111-113 is to alert the operator if he has installed the wrong size nozzles 30, or if moisture content and bulk crop flow rate change such that the nozzles installed are no longer suitable for the conditions being experienced. Referring to FIGS. 4A and 4B, the values in the tables for a given bulk rate of crop flow increase as the percent moisture content increases. Also, the values in the tables for a given crop moisture content increase as the bulk rate of crop flow increases. Smaller size nozzles will not permit sufficient substance to be dispensed if, for example, the bulk crop flow rate is 15 tons per hour and the crop moisture content is greater than 26%. Generally, a broken line 116 divides the table of FIG. 4A into those values which, when converted to pulse width modulated signals, will drive the pump 34A at a speed great enough to dispense the substance at the desired rate, and those values which will not. The values which will not fall below the line 116. Therefore, a first reference value is stored in the microprocessor memory which is equal to the smallest value below line 116. If the nozzle size switch 54 was set for small nozzles when sensed at step 107, this first reference value is compared at step 111 with the value read from the table at step 109 and, if the first reference value is smaller the warning indicator 56 is turned on at step 113 to warn the operator that he should change nozzles. If the first reference value is not smaller the program jumps to step 112 to turn the indicator 56 off.

At low rates of bulk crop flow through the baler and low moisture content, some of the binary values in the table of FIG. 4B do not produce the desired rate of substance dispensing when large nozzles 30 are installed. Under these conditions the values in the table cause pump 34A to rotate at a speed insufficient to produce the desired pressure in fluid conduit 36. These values appear in the table above the line 118. Therefore, a second reference value is stored in the microprocessor memory, this value being equal to the largest value above line 118. When the nozzle size switch 54 was set for large nozzles when sensed at step 107, this second reference value is compared at step 111 with the value read from the table at step 110 and, if the second reference value is greater then the program turns on the warning indicator 56 at step 113. If the second reference value is not greater than the value read from the table at step 110 the program jumps to step 112 to turn the indicator 56 off.

After step 112 or 113 the program moves to step 114 where it begins producing the pulse width modulated signal in the manner described above. After the control circuit means sets up and starts producing the pulse width modulated signal the program jumps back to step 101.

Figure 5:
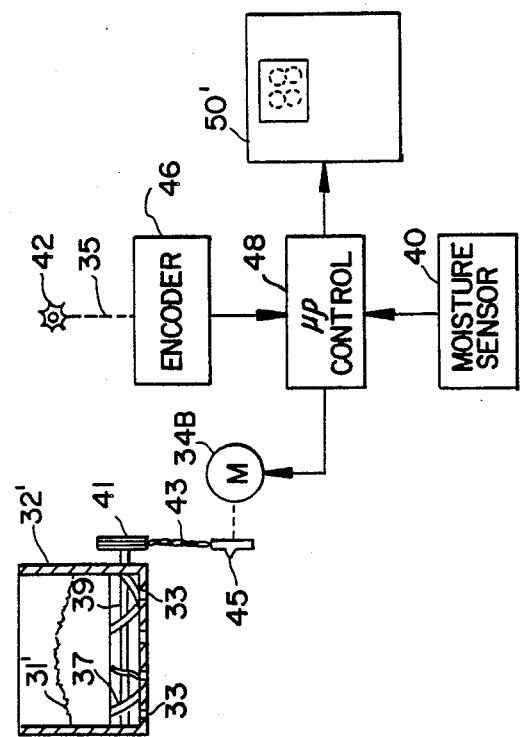
FIG. 5 is a schematic diagram of a dispensing system for dispensing a dry particulate substance onto crop material entering a square baler.

FIG. 5 illustrates a system for dispensing a substance 31' in dry particulate form onto crop material moving through a square baler. A supply of the substance 31' is stored in a container in the form of a dispensing hopper 32'. The hopper 32' is provided with downwardly sloping sides along its width and a plurality of holes 33 located at the bottom of the hopper. An auger 37 is mounted on a shaft 39 which is journaled in the sides of the hopper. A pulley or gear 41 is mounted on shaft 39 and driven by a belt or chain 43 from a further pulley or gear 45 driven by motor 34B.

The hopper 32' may be mounted on top of a square baler of the type illustrated in FIG. 1, the shaft 39 extending transverse to the direction of crop infeed with the holes 33 being spaced above the infeed like the nozzles 30 so that the substance is deposited across the width of the crop material entering the baler. A slot (not shown) may be provided in top cover 47 (FIG. 1) so that dispensed substance may fall through the slot onto the crop material.

The star-wheel 42, encoder 46, control circuit means 48 and moisture sensor 40 of FIG. 5 are positioned and connected in the same manner as in FIG. 2. The control circuit means generates an output signal to drive motor 34B at a rate which is dependent on the rate of bulk crop flow sensed by star-wheel 42 and the moisture content sensed by moisture sensor 40. Motor 34B then drives auger 37 through the drive means 45, 43, 41 at a variable rate depending on the conditions sensed to thereby vary the rate at which substance is dispensed.

Since the embodiment of FIG. 5 does not have control nozzles, the operator panel 50 of this embodiment does not require an input switch corresponding to switch 54 of FIG. 2. Also, only a single table of values for conversion to pulse width modulated signals need be provided. This table stores values essentially in the same manner as the tables of FIGS. 4A and 4B although, obviously, the stored values are different.

The program illustrated in FIG. 3 is suitable for use in the control circuit means 48 of FIG. 5 if the nozzle reading operation of step 107, and steps 108-113 are eliminated.

Figure 6:
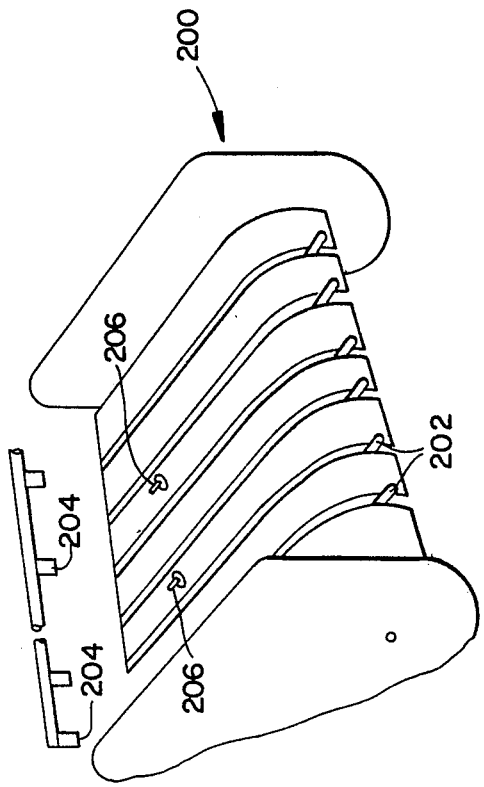
FIG. 6 is a perspective view of a liquid dispensing system for dispensing a substance onto crop material entering a round baler; and, FIG. 7 is a block diagram of a circuit for controlling the dispensing of a liquid or a dry particulate substance onto crop material entering a round baler.

The invention is also applicable to round balers of the type shown in U.S. Pat. No. 4,748,802. Either the liquid dispensing system of FIG. 2 or the dry particulate dispensing system of FIG. 5 may be adapted for use on such balers. FIG. 6 shows a typical round baler infeed 200 having tines 202 for picking up the crop material from the ground and feeding it into the baler. The dispensing means, illustrated in FIG. 6 as liquid spray nozzles 204 are disposed across the infeed to thereby dispense a substance onto the crop material before it is fed into the baler.

In a round baler, the moisture sensing means comprises one or more moisture sensor probes 206 mounted below the infeed and extending upwardly and rearwardly with respect to the infeed so as to sense the moisture of the crop material being fed into the baler.

Figure 7:
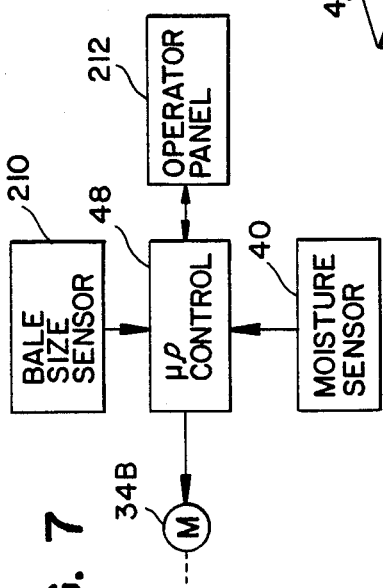

A star-wheel sensor, such as the star-wheel sensor of FIGS. 2 and 5, is not suitable for use in a round baler for sensing the bulk rate of crop flow through the baler. As illustrated in FIG. 7, a bale size sensor 210 is provided instead. The bale size sensor may be a quadrature encoder as described in U.S. Pat. No. 4,748,802 producing digital outputs signals or a potentiometer as described in U.S. Pat. No. 4,855,924. These devices are adapted to sense movement of the apron mechanism as a bale is being formed in the baling chamber of a round baler. In the case where the sensor 210 is a quadrature encoder, the control circuit means 48 accumulates pulses over a period of time and from the pulses determines the rate at which a bale is increasing in size. From this the control circuit means 48 determines the bulk rate at which crop material is moving into the baler.

If the bale size sensor 210 is a potentiometer, it continuously produces an analog output signal indicating the size of the bale being formed. This analog signal is converted into a digital representation of bale size by control circuit means 48. The control circuit means determines the rate of increase of bale size and from this determines the bulk rate at which crop material is entering the baler.

Once the bulk rate of crop flow has been determined, the embodiment of FIG. 7 functions in the same manner as the embodiments of FIGS. 2 and 5. That is, the control circuit means 48 uses the bulk rate of crop flow as determined from the output of sensor 210 and the moisture content as determined by the signal from moisture sensor 40 to access a table and read therefrom a value which is converted to a pulse width modulated signal for driving motor 34B at some desired rate of rotation. The motor 34B in turn drives a pump in the manner shown in FIG. 2 or a hopper auger as shown in FIG. 5 to dispense a substance onto the crop material. The operator panel 212 may have the features of operator panel 50 or operator panel 50', depending on whether the substance being dispensed is a liquid or a dry particulate substance, respectively.

While various preferred embodiments of the invention have been described in specific detail it will be understood that various modifications and substitutions may be made in the described embodiments without departing from the spirit and scope of the invention as defined by the appended claims. For example, while the embodiments of the invention described above employ sensing means for sensing both the bulk rate of crop flow and moisture content, it will be recognized that an improvement in operation over the prior art may be obtained by using a sensor for sensing one or the other of these conditions. For example, in applying preservative to a crop of hay, less preservative is wasted if the rate at which the preservative is dispensed is varied according to the moisture content of the crop material. Alternatively, less wastage of the preservative occurs when its rate of application is varied in accordance with the bulk rate of crop flow.

The embodiments of the invention in which an exclusive property or privilege is claimed are defined as follows.

1. In a round baler for picking up crop material and forming it into bales, a method of dispensing a substance from a container onto said crop material at a controlled rate, said method comprising:
   sensing the moisture content of said crop material to develop a first signal;
   sensing the size of a bale being formed in the baler to determine the rate of bale size increase;
   determining from the rate of bale size increase the bulk rate at which crop material is passing through the baler to develop a second signal;
   developing a third signal from said first and second signals; and,
   dispensing said substance onto the crop material at a rate determined by said third signal.

2. The method as claimed in claim 1 wherein said substance is a preservative for preventing spillage of crop material in said bales.

3. The method as claimed in claim 2 wherein said preservative is a liquid preservative.

4. The method as claimed in claim 2 wherein said preservative is in dry particulate form.

5. The method as claimed in claim 1 wherein said substance is dispensed onto the crop material before it is formed into bales.

6. The method as claimed in claim 1 wherein the step of developing a third signal comprises the step of generating a pulse width modulates signal as said third signal.

7. In a baler for picking up crop material and forming it into bales, a method of dispensing a substance from a container onto said crop material at a controlled rate, said method comprising:
   sensing the moisture content of said crop material to develop a first signal;
   sensing the bulk rate at which crop material is passing through the baler to develop a second signal;
   generating a pulse width modulated signal from said first and second signals;
   providing a motor driven in dispenser; and,
   driving the motor driven dispenser at a speed determined by the pulse width modulated signal whereby the rate at which the substance is dispensed onto the crop material is controlled only by the pulse speed at which the pulse width modulated signal drives the motor driven dispenser.

8. In a baler for picking up crop material and forming it into bales, a method of dispensing a substance from a container onto said crop material at a controlled rate, said method comprising:
   sensing the moisture content of said crop material to develop a first signal;
   sensing the bulk rate at which crop material is passing through the baler to develop a second signal;
   generating a third signal from said first and second signals;
   providing a dispenser pump driven by a motor; and,
   applying the third signal to the motor to control its speed whereby the rate at which the substance is dispensed onto the crop material is controlled only by the speed at which the third signal drives the motor.

* * * * *